United States Patent
Brandin et al.

(10) Patent No.: US 11,607,921 B2
(45) Date of Patent: Mar. 21, 2023

(54) BUSHING

(71) Applicant: Volvo Car Corporation, Gothenburg (SE)

(72) Inventors: Tobias Brandin, Hålta (SE); Kenneth Ingemar Ekström, Gothenburg (SE); Jonas Klint, Gothenburg (SE); Jens Medbo, Kungälv (SE); Albin Johnsson, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 17/185,448

(22) Filed: Feb. 25, 2021

(65) Prior Publication Data

US 2021/0260948 A1 Aug. 26, 2021

(30) Foreign Application Priority Data

Feb. 26, 2020 (EP) ..................................... 20159573

(51) Int. Cl.
*B60G 9/02* (2006.01)
*B60G 11/22* (2006.01)
*F16F 1/393* (2006.01)

(52) U.S. Cl.
CPC ................ *B60G 9/02* (2013.01); *B60G 11/22* (2013.01); *F16F 1/3935* (2013.01);
(Continued)

(58) Field of Classification Search
CPC .... B60G 9/02; B60G 11/22; B60G 2202/142; B60G 2204/41; B60G 2206/42;
(Continued)

(56) References Cited

U.S. PATENT DOCUMENTS 5,988,614 A * 11/1999 Sturmon .................. B60G 7/02
267/292

FOREIGN PATENT DOCUMENTS

DE 4010378 A1 10/1991
EP 0 872 367 A2 4/1998
(Continued)

OTHER PUBLICATIONS

Description Translation for DE 4010378 from Espacenet (Year: 1991).*
Description Translation for EP 1314585 from Espacenet (Year: 2003).*
(Continued)

*Primary Examiner* — Laura Freedman
*Assistant Examiner* — Daniel M. Keck
(74) *Attorney, Agent, or Firm* — Amin, Turocy & Watson, LLP

(57) ABSTRACT

The invention relates to an assembly comprising a bushing with a center line L, having an inner sleeve with a mounting bore, an outer sleeve and an elastomeric spring member extending along a height H along the center line L. In one embodiment, the outer surface of the inner sleeve, the spring member and the inner surface of the outer sleeve are on each side of the center line L substantially parallel. On at least one side of the longitudinal center line L, the outer surface of the inner sleeve, the spring member and the inner surface of the outer sleeve extend at an angle to the center line L. An outer surface of the outer sleeve is substantially parallel to the center line L along the height H. Another embodiment of an assembly according to the invention comprises a bushing with a mounting bore that extends at an angle to the center line L. The bushing according to the invention is compact, can be easily manufactured and assembled, take up a high load and can be adjusted to the direction along which forces act on the bushing.

12 Claims, 5 Drawing Sheets

(52) U.S. Cl.
CPC ...... *B60G 2202/14* (2013.01); *B60G 2204/41* (2013.01); *B60G 2206/42* (2013.01); *B60G 2206/73* (2013.01); *B60G 2800/162* (2013.01); *F16F 2224/025* (2013.01)

(58) Field of Classification Search
CPC .......... B60G 2206/73; B60G 2800/162; B60G 2200/30; B60G 2204/15; B60G 2204/4104; B60G 2204/41046; B60G 2204/423; B60G 2206/602; F16F 1/3935; F16F 2224/025; F16F 1/3863; B62D 21/11
See application file for complete search history.

(56) References Cited

FOREIGN PATENT DOCUMENTS

| EP | 0 872 367 | A3 | | 10/1998 | |
|---|---|---|---|---|---|
| EP | 1 314 585 | A2 | | 11/2001 | |
| EP | 1 314 585 | A3 | | 8/2002 | |
| EP | 1577126 | A1 | * | 9/2005 | .............. F16F 1/387 |
| GB | 2033533 | A | * | 5/1980 | ........... B60G 21/052 |
| WO | 2013/091852 | A1 | | 6/2013 | |

OTHER PUBLICATIONS

Description Translation for EP 1577126 from Espacenet (Year: 2005).*
Extended European Search Report for European Application No. 20159573.3 dated Oct. 27, 2020, 8 pages.

* cited by examiner

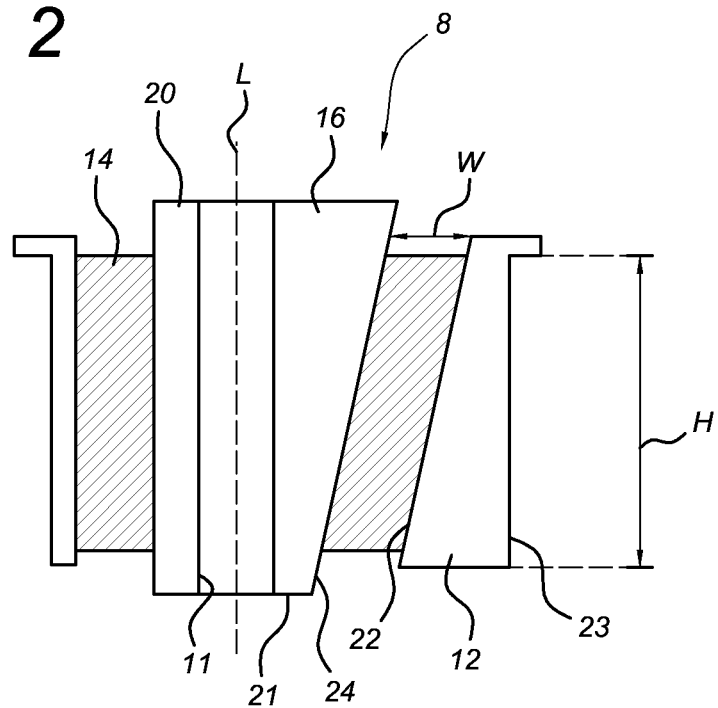
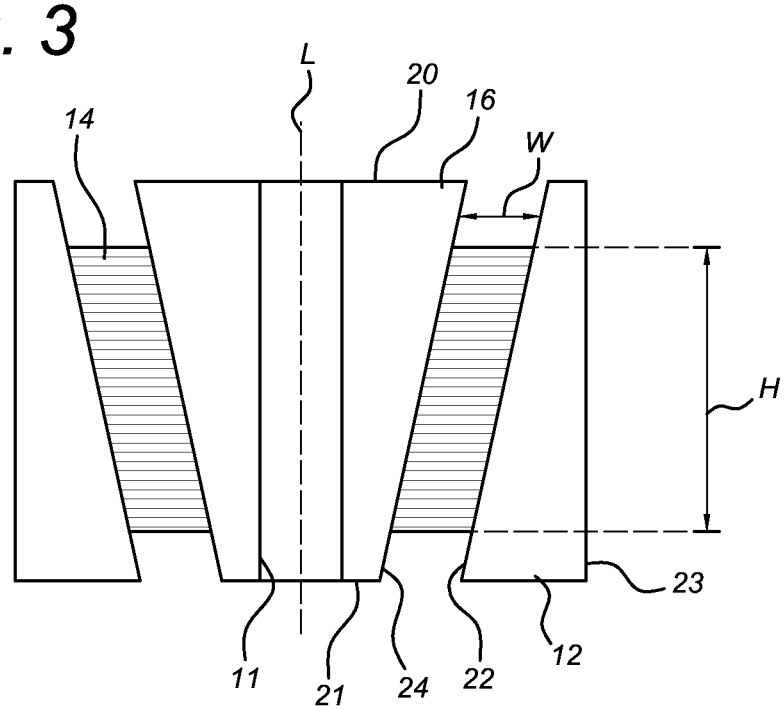

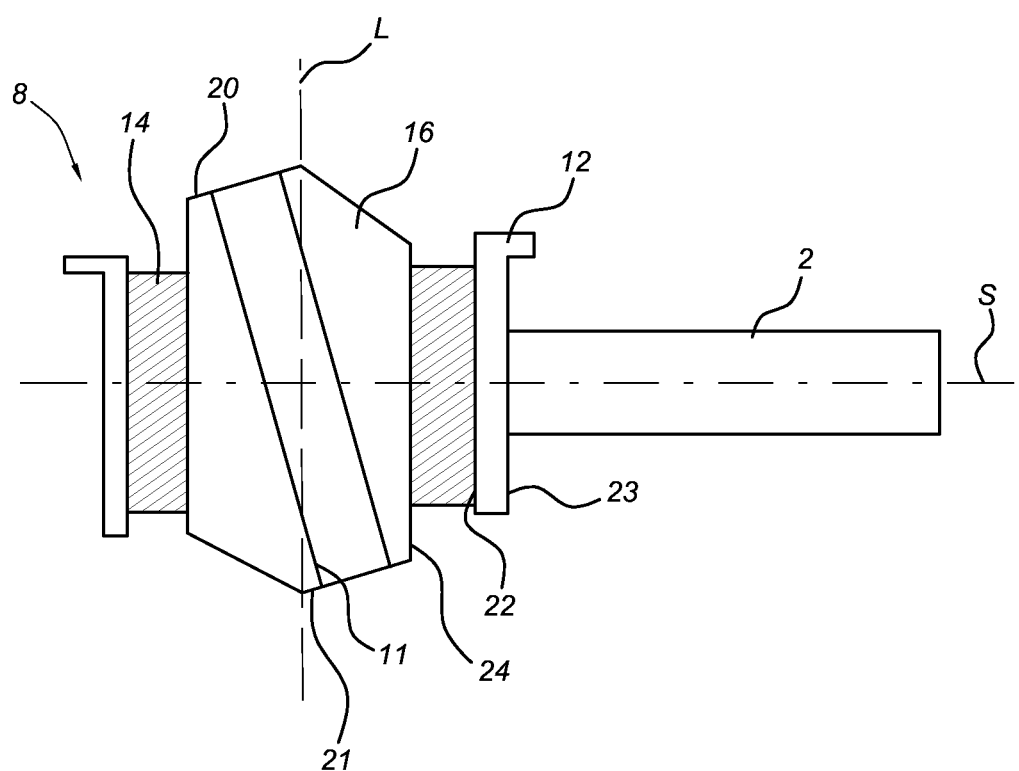

BUSHING

CROSS-REFERENCE TO RELATED APPLICATIONS

This application claims priority to EP patent application no. 20159573.3, filed on 26 Feb. 2020, entitled "Bushing." The entirety of the aforementioned application is hereby incorporated herein by reference.

The invention relates to an assembly comprising a bushing with a center line, an outer sleeve, a spring member and an inner sleeve, the assembly further comprising a transverse member that is attached to the outer sleeve.

The invention also relates to a bushing for use in a suspension, to a suspension for a road vehicle and to a vehicle comprising such a suspension.

BACKGROUND ART

In the prior art bushings are known with a tapering inner sleeve, a cylindrical outer sleeve and an elastomeric material in between the sleeves, in a coaxial configuration. The wider part of the inner sleeve is attached to the vehicle body in order to prevent damage upon exerting a repeated load on the bushing.

As the radial width of the elastomeric material varies along the height of the bushing, the elastic properties cannot be easily adapted to dynamic loads that are exerted on the bushing in a the specific application, such as a rear or front wheel suspension of a road vehicle. The orientation of the known bushing is in a vertical direction along its axis.

A vehicle is known comprising a suspension with a bushing that is provided with inner and outer sleeves that are inclined toward the inside of the wheels in order to get the right motion pattern of the suspension system which can provide increased driving stability. If the inclined parts of the elastomeric spring members are compressed inwardly, the vertical force stiffness of the bushing increases and an upwards force is generated. The known inner sleeve and spring member is formed of two parts. On each side of the longitudinal center line, the cross-section shows two segments of the outer surface of the inner sleeve, the spring member and the inner surface of the outer sleeve, that each are at a different angle with the vertical center line.

The known bushings are made up of a relatively large number of component parts. The sleeves have a complex shape that is difficult to produce and that cannot be easily connected to other vehicle parts by means of pressing.

In another known embodiment, a bushing has a center line of the inner metal fitting, having a mounting bore, at an angle to the center line of the outer metal fitting and the elastomeric spring member. A middle cylindrical metal fitting interconnects the inner fitting comprising the mounting bore to the outer metal fitting. The elastomeric spring member is relatively narrow, while the inner metal fitting provides a relatively light weight structure which may not be sufficiently strong to carry larger loads. The known bushing is not package-efficient and needs a relatively large volume to manage the loads. Furthermore, the construction is complex in view of many parts and volume of elastomeric material is relatively low.

SUMMARY

It is an object of the invention to provide a bushing of a relatively simple construction and relatively small volume, with a dynamic response that can be easily adapted to the system to which the bushing is connected. It is a further object to provide bushing that can be easily adapted to compensate for positional variations of the bushing that arise for instance from the packaging, the mounting procedure or the manufacturing process of the components that are connected to the bushing. It is again an object of the invention to provide a bushing that can take up high loads and that can be easily connected to various vehicle parts.

Hereto a bushing according to the invention is characterised in that in a vertical cross-section that comprises the center line along the height H,
- the outer surface of the inner sleeve, the spring member and the inner surface of the outer sleeve are on each side of the center line substantially parallel,
- on at least one side of the longitudinal center line, the outer surface of the inner sleeve, the spring member and the inner surface of the outer sleeve extend at an angle to the center line, and
- the outer surface of the outer sleeve is substantially parallel to the center line along the height H.

The spring member according to the invention is of a substantially constant thickness on each side of the longitudinal center line, along the height H of the inner sleeve. Hereby, well defined elastic properties of the spring member are obtained. The tapering inner and outer sleeves provides a varying stiffness of the bushing along its height. The choice of the angle of the sleeves to the center line determines the elastic dynamic properties of the bushing that can be controlled to be adapted to the specific application (suspension or other) and to the nature of the connecting member.

The spring member according to the invention can be formed of a single piece of resilient material with uniform elastic properties and has a small volume and a small number of components. The bushing according to the invention can be produced relatively easily by vulcanisation or gluing, and/or pre-compression of the elastomeric material with a reliable connection of the outer sleeve, the resilient material of the spring member and the inner sleeve. The spring member has a regular outer shape and can be fitted onto the vehicle component parts easily by pressing.

As the circumferential surface of the bushing can remain substantially parallel to the center line, the transverse member, which may for instance be a rear or front vehicle axle/subframe, can be connected in a perpendicular manner.

Another embodiment of an assembly according to the invention comprises a bushing with a center line, an inner sleeve having a mounting bore that extends through the inner sleeve from a top surface to a bottom surface, an outer sleeve and a spring member of an elastomeric material extending along a height H along the center line, the assembly further comprising a transverse member that is attached to the outer sleeve, wherein in a vertical cross-section that comprises the center line, along the height H, the outer surface of the inner sleeve, the spring member and the inner surface of the outer sleeve are parallel to the center line, on each side of the longitudinal center line, wherein the mounting bore extends at an angle with the center line, the elastomeric material being in contact with the inner surface of the outer sleeve and the outer surface of the inner sleeve.

The present embodiment provides a relatively simple predetermined angled orientation of the bushing so that the transverse member that is connected to the outer sleeve, can be placed at the required angle relative to the mounting bore. As the surfaces of the inner sleeve, the spring member and the outer sleeve are all co-axial, the bushing is easily manufactured with a reliable adhesion of the spring member to both sleeves, resulting in a uniform load distribution in the axial direction. The bushing according to the invention has a large load bearing capacity and can be designed for low shear stress in the elastomeric material.

The transverse member can in one embodiment be oriented substantially perpendicular to the center line. The assembly according to the invention may comprise a suspension for a road vehicle having a substantially horizontal transverse axle that is on each end attached to an outer sleeve of a respective bushing with a substantially vertically extending mounting bore, and to a wheel.

In another embodiment, the mounting bore of the inner sleeve is at an angle of between 0 and 40 degrees, preferably between 5 and 15 degrees from the center line, preferably about 10 degrees. The assembly according to this embodiment of the invention may comprise a suspension with a transverse axle with a substantial horizontal central part. The axle/subframe is on each end attached to a bushing with a substantially vertically extending mounting bore, and to a wheel, via end members that extend at an angle with the central part and that are connected to a respective outer sleeve. The end parts of the transverse axle may for instance be formed by inclined axial snubbers that connect to the bushings that are angled indwards with respect to the vehicle.

In again an embodiment of an assembly according to the invention, the spring material comprises an elastomeric material, for instance of any one of the materials rubber or rubber compound, silicon, nitil and polyurethane or a combination thereof.

The spring member material preferably has an E modulus between 0.5 Megapascal (MPa) and 10 MPa, a shear modulus of between 0.1 MPa and 3 Mpa and a damping of 0-30 degrees in phase between force and displacement.

The assembly according to the invention is preferably comprised in a suspension for a road vehicle having a substantially horizontal transverse axle that is on each end attached to an outer sleeve of a respective bushing with a substantially vertically extending mounting bore, and to a wheel. The bushing according to the invention is inclined relative to the direction of the axle to provide an optimal motion pattern and force distribution on the bushing in all directions.

BRIEF DESCRIPTION OF THE DRAWINGS

Some embodiments of an assembly according to the invention will by way of non-limiting example be described in detail with reference to the accompanying drawings. In the drawings:

FIG. 2 shows a cross-sectional view of the bushing of FIG. 1 on an enlarged scale, FIG. 3 shows a cross-sectional view of another embodiment of a bushing according to the invention, FIG. 6 shows a cross-sectional view of the bushing of FIG. 5 on an enlarged scale.

DESCRIPTION OF EMBODIMENTS

Figure 1:
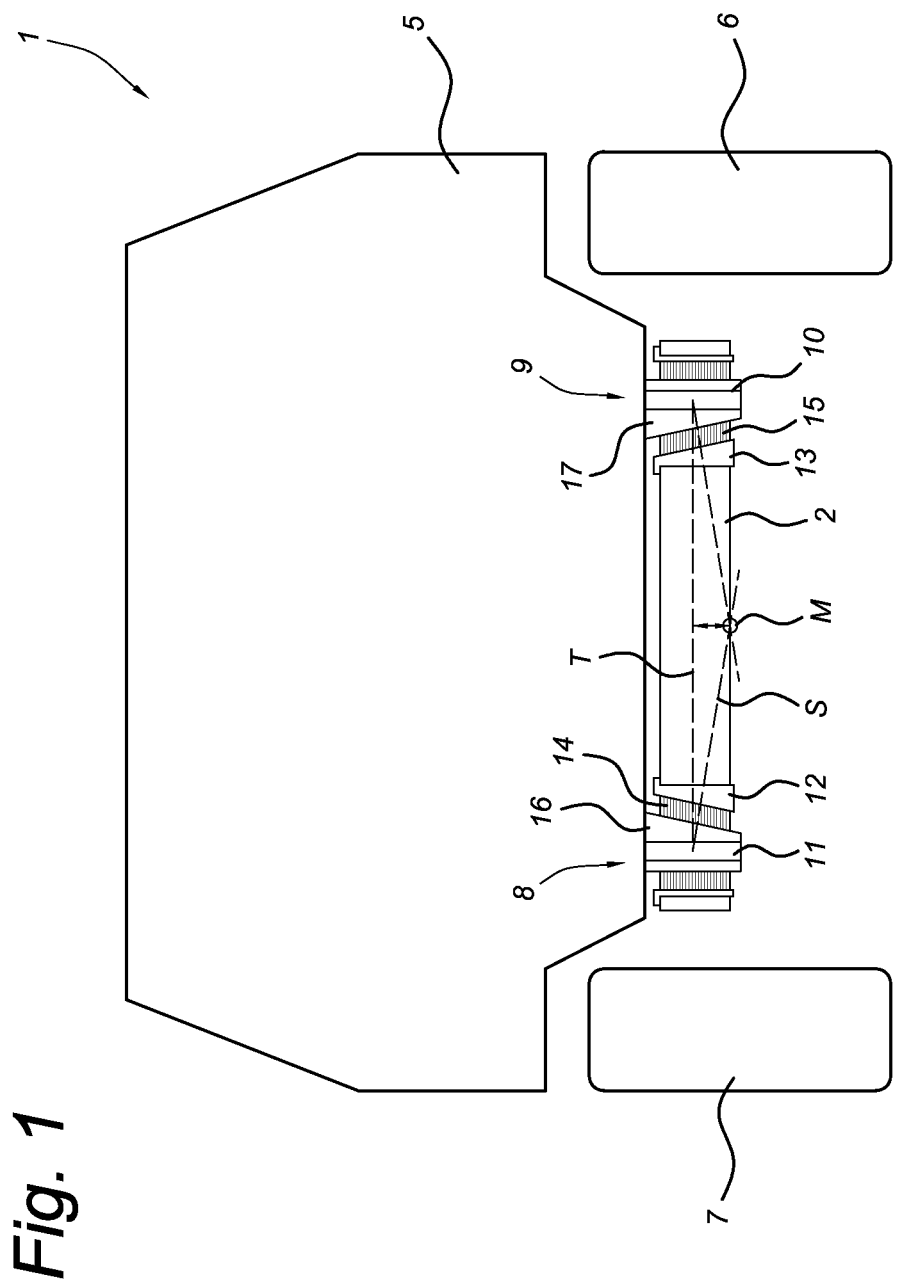
FIG. 1 shows a schematic view of a road vehicle with an assembly according to the invention.

FIG. 1 shows a vehicle 1 with a rear axle 2 that is connected to a frame or chassis module 5 and that carries two wheels 6, 7. The axle 2 is connected to the chassis module 5 via two bushings 8,9 via bolts (not shown) extending through vertically oriented mounting bores 10,11 in the bushings. The bushings 8,9 each have an outer sleeve 12, 13 with an outer surface that is substantially perpendicular to the horizontal length direction T of the axle 2. The bushings 8,9 are provided with a spring member 14,15 of an elastomeric material extending around an inner sleeve 16, 17 such that the spring member 14, 15 is oriented transverely to a line S along which forces acting on the center of mass M are transferred to the bushings.

FIG. 2 shows the bushing 8 on an enlarged scale, having an assymetric configuration relative to the center line L. The mounting bore 11 extends from a top surface 20 to a lower surface 21 of the bushing and attaches the bushing to a vehicle module via a bolt through the mounting bore. The outer sleeve 12 has an inner surface 22 that is at an angle relative to the center line L and an outer surface 23 that extends parallel to the center line L. The inner sleeve 16 has an outer surface 24 that is oriented parallel to the inner surface 22 of the outer sleeve 23, so that the spring member 14 of elastomeric material is of a substantially constant width W along the height H of the bushing 8.

FIG. 3 shows an embodiment of a bushing 8 according to the invention, which is symmetrical relative to the center line L.

Figure 4:
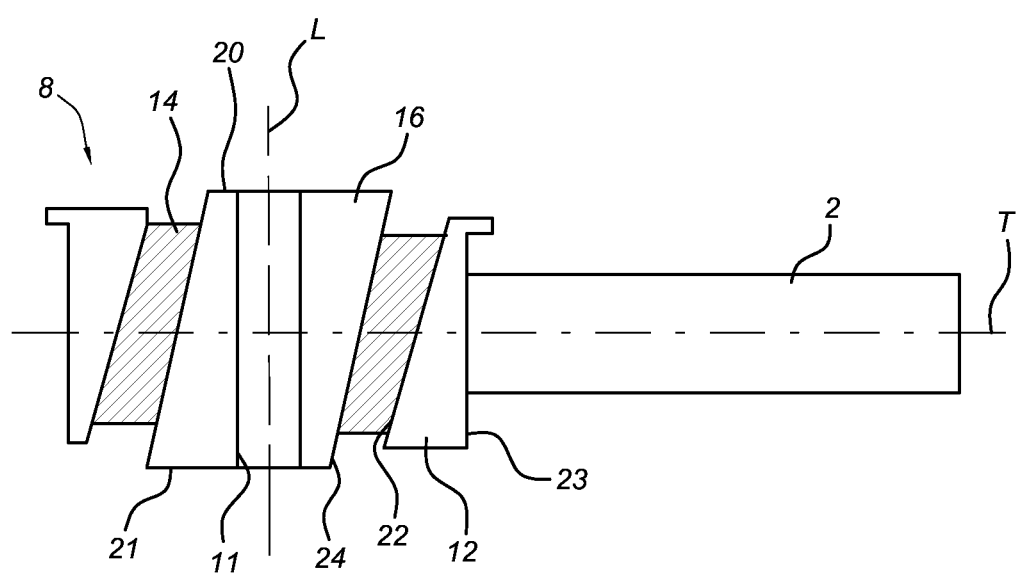
FIG. 4 shows a cross-sectional view of a further embodiment of a bushing according to the invention.

FIG. 4 shows another embodiment of a symmetric bushing 8 which is connected to the rear axle 2 with the center line T of the axle 2 being substantially perpendicular to the center line L of the bushing 8.

Figure 5:
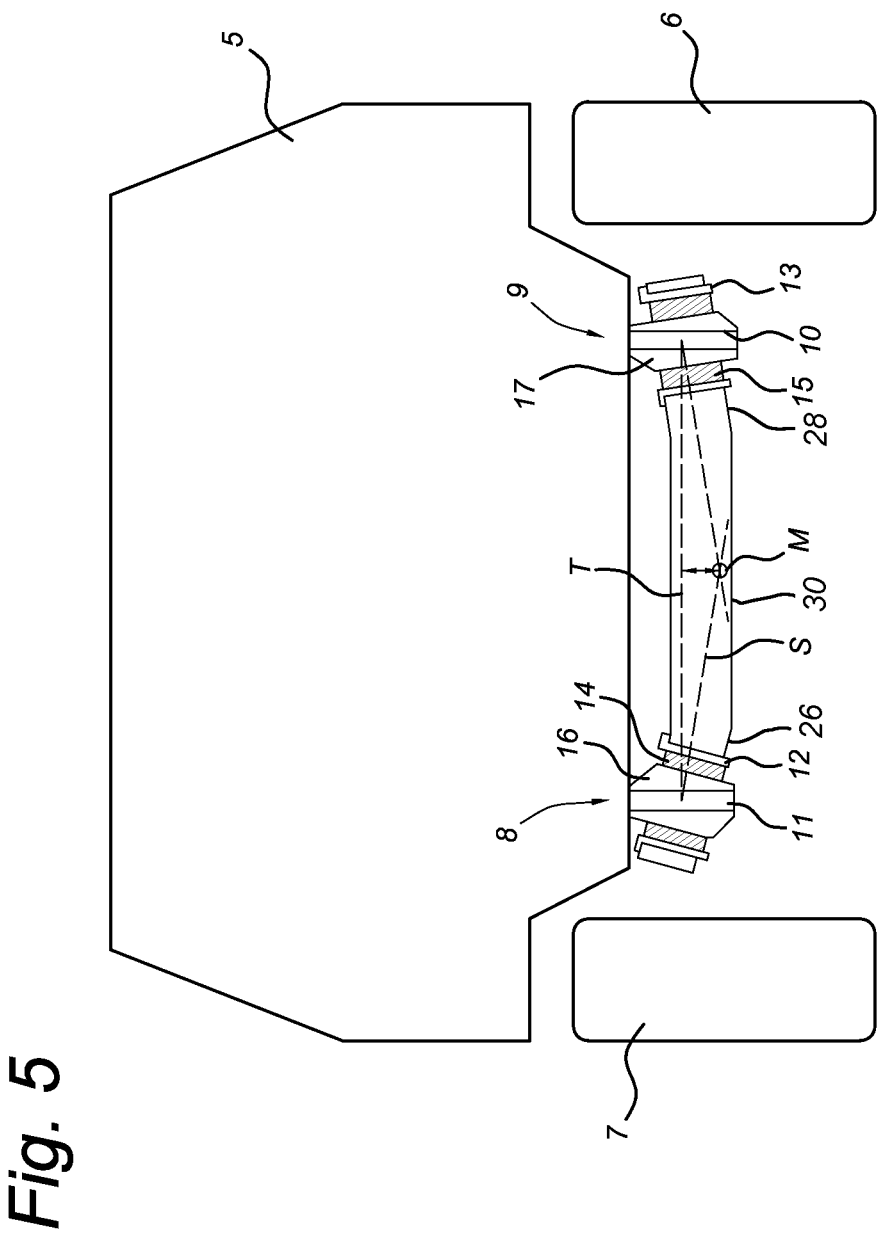
FIG. 5 shows a schematic view of a road vehicle with a bushing having an angled mounting bore.

FIG. 5 shows an embodiment of bushings 8, 9 in which the mounting bores 10, 11 extend at an angle to the center line L of the bushings. The outer surfaces 23, 24 of the outer and inner sleeves 12, 13; 16, 17 and the spring members 14, 15 are oriented substantially transversely to the direction S so that forces from the center of mass M acting long this direction S can be properly taken up by the bushings 8, 9. The end parts 26, 28 of the transverse axle 20 may for instance be formed by inclined axial snubbers that connect to the bushings that are angled indwards with respect to the vehicle.

FIG. 6 shows the bushing 8 of FIG. 5 on an enlarged scale, with its center line L extending in a vertical direction. When the mounting bore 11 is attached to a vehicle module while being perpendicularly aligned, forces along the direction S at angle to the horizontal are properly taken up.

The invention claimed is:
1. An assembly comprising:
a bushing:
having a longitudinal center line L, having an inner sleeve with a mounting bore that extends through the inner sleeve from a top surface to a bottom surface, an outer sleeve and an spring member extending along a height H along the longitudinal center line L, the assembly further comprising a transverse member that is attached to the outer sleeve, wherein in a vertical cross-section that comprises the longitudinal center line L along the height H, the bushing comprises:
a first outer surface of the inner sleeve, the spring member, and an inner surface of the outer sleeve are on each side of the longitudinal center line L substantially parallel;
on at least one side of the longitudinal center line L, the outer surface of the inner sleeve, the spring member, and the inner surface of the outer sleeve extends at an angle to the longitudinal center line L; and a second outer surface of the outer sleeve is substantially parallel to the longitudinal center line L along the height H, wherein the outer sleeve is configured to receive an axle inserted at least partially within the outer sleeve, and wherein a line from the inner surface of the outer sleeve in a normal direction from the angle passes through a point of a center of mass of the axle inserted at least partially within the outer sleeve.

2. The assembly of claim 1, wherein the angle is a first angle, and the mounting bore extends at a second angle with the longitudinal center line L; and an elastomeric material of the spring member is in contact with the inner surface of the outer sleeve and the outer surface of the inner sleeve.

3. The assembly of claim 2, wherein a width W of the elastomeric material of the spring member in the vertical cross-section is substantially constant along the height H.

4. The assembly of claim 2, wherein the mounting bore is at the second angle of between 0 and 40 degrees, preferably between 5 and 15 degrees from the longitudinal center line L, preferably about 10 degrees.

5. The assembly of claim 1, wherein the transverse member is situated substantially perpendicular to the longitudinal center line L.

6. The assembly of claim 1, wherein an elastomeric material of the spring member comprises at least one of rubber, a rubber compound, silicon, nitil, or polyurethane.

7. The assembly of claim 1, wherein the spring member has an E modulus between 0.5 Megapascal (MPa) and 10 MPa, a shear modulus of between 0.1 MPa and 3 Mpa and a damping of 0-30 degrees in phase between force and displacement.

8. A suspension for a road vehicle comprising:
an assembly comprising at least a first bushing and a second bushing, wherein at least the first bushing having a longitudinal center line L, having an inner sleeve with a mounting bore that extends through the inner sleeve from a top surface to a bottom surface, a first outer sleeve and an spring member extending along a height H along the longitudinal center line L, the assembly further comprising a transverse member that is attached to the first outer sleeve, wherein in a vertical cross-section that comprises the longitudinal center line L along the height H, the first bushing comprises:
a first outer surface of the inner sleeve, the spring member, and an inner surface of the first outer sleeve are on each side of the longitudinal center line L substantially parallel;
on at least one side of the longitudinal center line L, the outer surface of the inner sleeve, the spring member, and the inner surface of the first outer sleeve extends at an angle to the longitudinal center line L; and
a second outer surface of the first outer sleeve is substantially parallel to the longitudinal center line L along the height H,
the suspension having:
a transverse axle, wherein a first end portion of the transverse axle is inserted within the first outer sleeve of the first bushing, and a second end portion of the transverse axle is inserted within an outer sleeve of the second bushing, and the transverse axle is attached at a first end of the first end portion to a first wheel and attached at a second end of the second end portion to a second wheel; and
a substantially vertically extending mounting bore.

9. The suspension for a road vehicle of claim 8, wherein the angle is a first angle, the mounting bore extends at a second angle to the longitudinal center line L, an elastomeric material of the spring member is in contact with the inner surface of the first outer sleeve and the outer surface of the inner sleeve, and the transverse axle comprises:
a substantially horizontal central portion that is on respective ends of the substantially horizontal central portion attached to the first end portion and the second end portion, wherein the first end portion and the second end portion extend at a third angle from the substantially horizontal central portion.

10. The suspension for a road vehicle of claim 8, wherein the first end portion and the second end portion of the transverse axle comprise inclined axial snubbers.

11. A road vehicle comprising:
an assembly comprising a bushing, the bushing having a longitudinal center line L, having an inner sleeve with a mounting bore that extends through the inner sleeve from a top surface to a bottom surface, an outer sleeve and an spring member extending along a height H along the longitudinal center line L, the assembly further comprising a transverse member that is attached to the outer sleeve, wherein in a vertical cross-section that comprises the longitudinal center line L along the height H, the bushing comprises:
a first outer surface of the inner sleeve, the spring member, and an inner surface of the outer sleeve are on each side of the longitudinal center line L substantially parallel;
on at least one side of the longitudinal center line L, the outer surface of the inner sleeve, the spring member, and the inner surface of the outer sleeve extends at an angle to the longitudinal center line L; and
a second outer surface of the outer sleeve is substantially parallel to the longitudinal center line L along the height H, wherein the outer sleeve is configured to receive an axle inserted at least partially within the outer sleeve, and wherein a line from the inner surface of the outer sleeve in a normal direction from the angle passes through a point of a center of mass of the axle inserted at least partially within the outer sleeve.

12. The road vehicle of claim 11, further comprising a second bushing and a second mounting bore, wherein the bushing and the second bushing are connected to a body mounted on the axle with wheels, via bolts extending through the mounting bore and the second mounting bore.

* * * * *